(12) United States Patent
Feyereisen et al.

(10) Patent No.: US 10,883,851 B2
(45) Date of Patent: Jan. 5, 2021

(54) SYSTEMS AND METHODS FOR DYNAMIC READOUTS FOR PRIMARY FLIGHT DISPLAYS

(71) Applicant: HONEYWELL INTERNATIONAL INC., Morris Plains, NJ (US)

(72) Inventors: Thea L. Feyereisen, Hudson, WI (US); Gang He, Morristown, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 179 days.

(21) Appl. No.: 16/132,934

(22) Filed: Sep. 17, 2018

(65) Prior Publication Data
US 2020/0088542 A1 Mar. 19, 2020

(51) Int. Cl.
*G01C 23/00* (2006.01)
*B64D 43/02* (2006.01)

(52) U.S. Cl.
CPC ............ *G01C 23/00* (2013.01); *B64D 43/02* (2013.01)

(58) Field of Classification Search
CPC ........ G01C 23/00; G01C 5/06; G08G 5/0047; B64D 43/00
See application file for complete search history.

(56) References Cited

U.S. PATENT DOCUMENTS

| | | | |
|---|---|---|---|
| 5,844,504 A | 12/1998 | Etherington | |
| 6,567,014 B1 | 5/2003 | Hansen et al. | |
| 6,700,482 B2 | 3/2004 | Ververs et al. | |
| 7,403,133 B2 * | 7/2008 | He | G01C 23/00 340/974 |
| 2009/0189787 A1 | 7/2009 | Khatwa | |
| 2009/0201177 A1 | 8/2009 | Soler | |
| 2010/0023187 A1 * | 1/2010 | Gannon | G01C 23/00 701/7 |
| 2013/0169450 A1 * | 7/2013 | He | G01C 23/005 340/971 |
| 2019/0108760 A1 * | 4/2019 | Krishna | B64D 43/00 |
| 2019/0389594 A1 * | 12/2019 | Boelke | G01P 5/14 |

OTHER PUBLICATIONS

Alexander et al., Measurement and Modeling of Display Clutter in Advanced Flight Deck Technologies, The International Journal of Aviation Psychology, Oct. 2012, pp. 299-318, vol. 22 No. 4.

(Continued)

*Primary Examiner* — Kimberly S Berona
*Assistant Examiner* — Andy Schneider
(74) *Attorney, Agent, or Firm* — Lorenz & Kopf, LLP (57) ABSTRACT

Improved systems and methods for dynamic readouts on a primary flight display are provided. The system includes a computer system configured to receive and process aircraft status data and flight plan data to command a display system to overlay on the image, (i) an analog indicator of the airspeed, (ii) an analog indicator of altitude, (iii) a digital airspeed indicator, and (iv) a digital altitude indicator. The system continuously determines whether steady flight conditions are occurring. Steady flight conditions include one or both of: constant airspeed and constant rate of change of airspeed. When the steady flight conditions are occurring, (i) and (ii) are removed from the image. When the steady flight conditions are no longer occurring, (i) and (ii) again overlaid on the image.

18 Claims, 6 Drawing Sheets

(56) References Cited

OTHER PUBLICATIONS

Moacdieh et al., Effects of Modern Primary Flight Display Clutter: Evidence from Performance and Eye Tracking Data, Proceedings of the Human Factors and Ergonomics Society Annual Meeting, Sep. 2013, pp. 11-15, vol. 57, No. 1, University of Michigan, Ann Arbor, MI.

Navigation Systems—VRS Support Wiki; Navigation Head-Up Display (HUD); Retrieved from Internet [https://forums.vrsimulations.com/support/index.php/Navigation_Systems Sep. 11, 2018].

* cited by examiner

SYSTEMS AND METHODS FOR DYNAMIC READOUTS FOR PRIMARY FLIGHT DISPLAYS

TECHNICAL FIELD

The technical field generally relates to aircraft display systems, and more particularly relates to primary flight display systems.

BACKGROUND

As more and more information becomes depicted on primary flight displays, (e.g., synthetic vision and enhanced vision displays), the primary flight displays are becoming more cluttered. Clutter can reduce a user's ability to uptake information which manifests as a technical problem of presenting relevant and critical information to a user in the most beneficial way. Human factors studies show that as display clutter increases, the time for a pilot to extract required critical data also increases. Problems with extracting critical information from within a cluttered display can be further exacerbated in displays that overlay symbology onto external scene images, such as may be found in a Head Up Display (HUD), a Near To Eye (NTE) display, and a Helmet Mounted Display (HMD). In these situations, the symbology utilized may occlude critical information in the external scene, e.g., other traffic.

Another way increased clutter may inhibit a user's ability to uptake information is by causing some complacency. In some circumstances, pilots (and drivers of vehicles in general) faced with a cluttered screen can become numb to changes in symbology thereon. This complacency is especially a concern when the changing symbology is that of critical performance parameters. Therefore, presenting relevant and critical information to pilots without cluttering the screen and/or occluding relevant information is an ongoing technical problem.

Accordingly, improved systems and methods for presenting critical information to pilots without cluttering the screen and/or occluding relevant information are desired. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A flight display system for an aircraft is provided. The flight display system includes: a source of real-time aircraft status data; a display system configured to process the aircraft status data to display a continuously updated image depicting the aircraft status; and a computer system configured to receive and process the aircraft status data and the flight plan data to: (a) command the display system to overlay on the image, (i) an analog indicator of the airspeed, (ii) an analog indicator of altitude, (iii) a digital airspeed indicator, and (iv) a digital altitude indicator; (b) determine whether steady flight conditions are occurring; and upon determining that steady flight conditions are occurring: command the display system to remove (i) and (ii) from the image; repeat (b); and upon determining that steady flight conditions are not occurring, command the display system to return the overlay of (i) and (ii); and render graphic elements and a rate of change of speed indicator.

Also provided is a processor executable method for a flight display system in an aircraft. The method includes: receiving real-time aircraft status data; displaying a continually updated image of navigational information for the aircraft; overlaying the image with, (i) an analog indicator of the airspeed, (ii) an analog indicator of altitude, (iii) a digital airspeed indicator, and (iv) a digital altitude indicator; determining whether steady flight conditions are occurring, the steady flight conditions comprising an airspeed of the aircraft being constant; and upon determining that steady flight conditions are occurring: removing (i) and (ii) from the image; repeating determining whether steady flight conditions are occurring; and upon determining that steady flight conditions are not occurring, commanding the display system to return the overlay of (i) and (ii); and rendering graphic elements and a rate of change of speed indicator.

An aircraft is also provided. The aircraft includes: a source of flight plan data; a source of aircraft status data; a display system configured to process the flight plan data and the aircraft status data to render an image of navigational information for the aircraft; and a computer system configured to receive and process the aircraft status data and the flight plan data to: (a) command the display system to overlay on the image, (i) an analog indicator of the airspeed, (ii) an analog indicator of altitude, (iii) a digital airspeed indicator, and (iv) a digital altitude indicator; (b) determine whether steady flight conditions are occurring, the steady flight conditions comprising a speed of the aircraft being constant; and upon determining that steady flight conditions are occurring: command the display system to remove (i) and (ii) from the image; repeat (b); and command the display system to return the overlay of (i) and (ii) responsive determining that steady flight conditions are not occurring.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, clutter can a user's ability to uptake information which manifests as a technical problem of presenting relevant and critical information to a user in the most beneficial way. Some available declutter approaches perform a declutter in a manner that may cause a pilot to lose situation awareness with relationship to speed or altitude bugs, indications of critical parameters like stall speed and over-exceed speed, and depictions of the ground (as provided by an altitude tape or dial). Exemplary embodiments of the novel disclosed system for providing dynamic readouts for flight displays (FIG. 1, 102) provide a technical solution to this technical problem. Exemplary embodiments of the novel disclosed system go back and forth between displaying analog components on readouts and removing analog components from readouts, responsive to a trigger (the trigger defining steady flight conditions). The occurrence of the steady flight conditions trigger removal of analog components of readouts. The non-occurrence of the steady flight conditions triggers the return of the analog components of readouts and rendering graphic elements and a rate of change of speed indicator. Further, in various embodiments, techniques for attracting visual attention (such as fade-in and fade-out technique) additionally contribute to the provided technical solution. The figures and descriptions below provide more detail.

Figure 1:
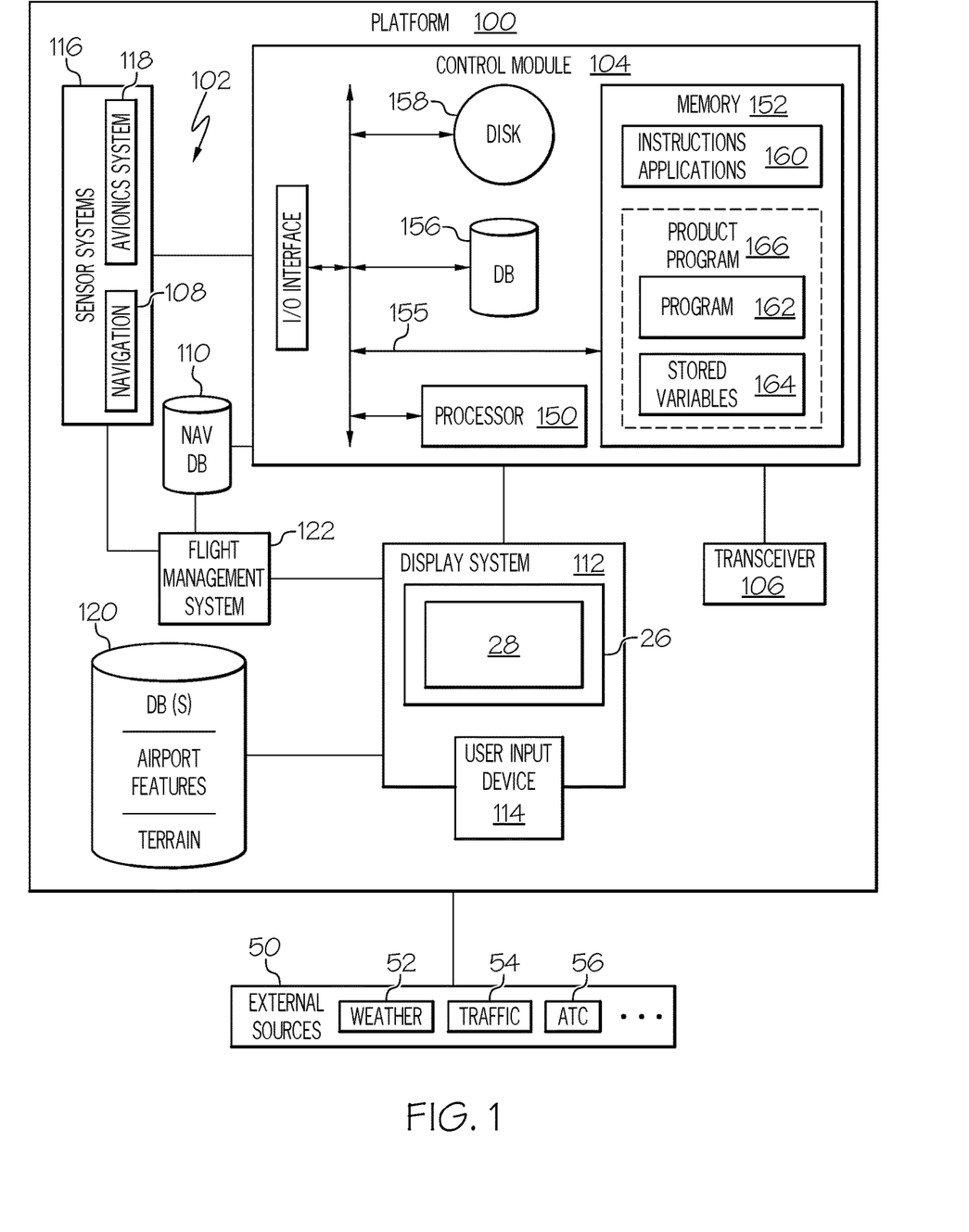
FIG. 1 is a block diagram of a system for providing dynamic readouts for primary flight displays, in accordance with an exemplary embodiment.

Turning now to FIG. 1, in an embodiment, the system for providing dynamic readouts for primary flight displays 102 (also referred to herein as "system" 102) is generally located in a mobile platform 100. In various embodiments, the mobile platform 100 is an aircraft, and is referred to as aircraft 100. The system 102 embodies a control module 104 (which is depicted in a functional form as a "computer system"). In some embodiments, the control module 104 may be integrated within a preexisting mobile platform management system, avionics system, cockpit display system (CDS), flight controls system (FCS), or aircraft flight management system (FMS 122). Although the control module 104 is shown as an independent functional block, onboard the aircraft 100, optionally, it may exist in an optional electronic flight bag (EFB). In embodiments in which the control module is within an EFB, the display system 112 and user input device 114 may also be part of the EFB. Further, in some embodiments, the control module 104 may reside in a portable electronic device (PED) such as a tablet, cellular phone, or the like.

The control module 104 performs the processing functions of the system 102. To perform these functions, the control module 104 may be operatively coupled to any combination of the following aircraft systems: a source of real-time aircraft status data, such as a navigation system 108; a source of prescribed flight plan data, such as a navigation database (NavDB 110); and, a display system 112. In various embodiments, the control module 104 is additionally operationally coupled to one or more of: a transceiver 106; a user input device 114; one or more databases 120; a flight management system (FMS 122); and one or more avionics systems sensors 118. The functions of these aircraft systems, and their interaction, are described in more detail below.

The navigation system 108 is a type of sensor system within a sensor system functional block, (sensor system(s) 116). The navigation system 108 is configured to provide real-time navigation data and/or information regarding operation of the aircraft 100. As used herein, "real-time" is interchangeable with current and instantaneous. The navigation system 108 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS 122, as will be appreciated in the art. The data provided by the navigation system 108 is referred to as navigation data (also referred to herein as aircraft status data). Aircraft status data may include any of: an instantaneous position (e.g., the latitude, longitude, orientation), a flight path angle, a vertical speed, a ground speed, an instantaneous altitude (or height above ground level), an instantaneous heading of the aircraft 100 (i.e., the direction the aircraft is traveling in relative to some reference), and a current phase of flight. The real-time aircraft status data, or navigation data, is made available such that the display system 112, the transceiver 106, and the control module 104, may further process and/or handle the aircraft status data.

Prescribed flight plan data may include a series of intended geospatial midpoints between a departure and an arrival, as well as performance data associated with each of the geospatial midpoints (the performance data including intended navigation data such as intended airspeed, intended altitude, intended acceleration, intended flight path angle, and the like). A source of a prescribed flight plan data may be a storage location or a user input device. In various embodiments, the NavDB 110 is the source of a prescribed flight plan. The navigation database (NavDB 110) is a storage location that may also maintain a database of flight plans, and/or information regarding terrain and airports and/or other potential landing locations (or destinations) for the aircraft 100. In operation, the navigation system 108 and the NavDB 110 may be integrated with a FMS 122.

The avionics system(s) 118 is another type of sensor system within the sensor system(s) 116. In various embodiments, the avionics system(s) 118 provide aircraft performance data and feedback for subsystems on the aircraft 100. Examples of the aircraft performance data include: engine thrust level, fuel level, braking status, temperature control system status, and the like. As may be appreciated, the avionics system(s) 118 may therefore include a variety of on-board detection sensors, and, as part of the sensor systems 116, may be operationally coupled to the FMS 122.

In various embodiments, the FMS 122, in cooperation with the sensor systems 116 and the NavDb 110, provides real-time flight guidance for aircraft 100. The FMS 122 is configured to compare the instantaneous position and heading of the aircraft 100 with a prescribed flight plan for the aircraft 100. To this end, in various embodiments, the NavDB 110 supports the FMS 122 in maintaining an association between a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like). In various embodiments, the FMS 122 also supports controller pilot data link communications (CPDLC), such as through an aircraft communication addressing and reporting system (ACARS) router; this feature may be referred to as a communications management unit (CMU) or communications management function (CMF). Accordingly, in various embodiments, the FMS 122 may be a source for the real-time aircraft status data of the aircraft 100.

The display system 112 includes a display device 26 for presenting an image 28. The display system 112 is configured to continuously receive and process real-time aircraft status data and flight plan information. In various embodiments, the display system 112 formats and renders information received from the FMS 122, as well as external sources 50. In various embodiments, the display system 112 may directly receive input from an air data heading reference system (AHRS), an inertial reference system (IRS), the navigation system 108, or the FMS 122. The control module 104 and the display system 112 are cooperatively configured to generate the commands ("display commands") for the display device 26 to render thereon the image 28, comprising various graphical user interface elements, tables, menus, buttons, and pictorial images, as described herein. In exemplary embodiments, the display device 26 is realized on one or more electronic display devices configured as any combination of: a head up display (HUD), an alphanumeric display, a vertical situation display (VSD) and a lateral navigation display (ND). The display device 26 is responsive to display commands from the control module 104 and/or display system 112.

Renderings on the display system 112 may be processed by a graphics system, components of which may be integrated into the display system 112 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes, and for causing objects and symbols to fade-in and fade-out. As used herein, a fade-in and/or fade-out means changing between not being rendered at all (i.e., zero percent) and being fully rendered (i.e., 100%) in incremental steps. The control module 104 is said to display various images and selectable options described herein. In practice, this may mean that the control module 104 generates display commands, and, responsive to receiving the display commands from the control module 104, the display system 112 displays, renders, or otherwise visually conveys on the display device 26, the graphical images associated with operation of the aircraft 100, and specifically, the graphical images as described herein.

The user input device 114 and the control module 104 are cooperatively configured to allow a user (e.g., a pilot, co-pilot, or crew member) to interact with display devices in the display system 112 and/or other elements of the system 102, as described in greater detail below. Depending on the embodiment, the user input device 114 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 114 is configured as a touchpad or touchscreen, it may be integrated with the display system 112. As used herein, the user input device 114 may be used to for a pilot to accept a runway change or to request a runway change.

In various embodiments, any combination of the FMS 122, user input device 114, and transceiver 106, may be coupled to the display system 112 such that the display system 112 may additionally generate or render, on a display device 26, real-time information associated with respective aircraft 100 components. Coupled in this manner, the FMS 122 and transceiver 106 are configured to provide navigation information to support navigation, flight planning, and other aircraft control functions in a conventional manner, as well as to provide real-time data and/or information regarding the operational status of the aircraft 100 to the control module 104. In some embodiments, the user input device 114, FMS 122, and display system 112 are configured as a control display unit (CDU).

External sources 50 communicate with the aircraft 100, generally by way of transceiver 106. External sources include: weather and surface data sources (weather 52), such as a source for meteorological terminal aviation weather reports (METARS), automatic terminal information service (ATIS), datalink ATIS (D-ATIS), automatic surface observing system (ASOS); traffic data system(s) 54; air traffic control (ATC) 56; and a variety of other radio inputs. The traffic data system(s) 120 include numerous systems for providing real-time neighbor/relevant traffic data and information. For example, traffic data sources 54 may include any combination of: traffic collision avoidance system (TCAS), automatic dependent surveillance broadcast (ADS-B), traffic information system (TIS), crowd sourced traffic data and/or another suitable avionics system. Flight traffic information that is received from the traffic data system may include, for each neighbor aircraft of a plurality of neighbor aircraft, one or more of a respective (i) instantaneous position and location, vertical speed, and ground speed, (ii) instantaneous altitude, (iii) instantaneous heading of the aircraft, and (iv) aircraft identification. Information received from external sources may be processed as one or more information layers (for example, a weather layer, a traffic layer, and the like) and layers may be selectively overlaid on an existing image 28.

The transceiver 106 is configured to support instantaneous (i.e., real time or current) communications between the aircraft 100 and the one or more external data source(s) 50. As a functional block, the transceiver 106 represents one or more transmitters, receivers, and the supporting communications hardware and software required for the system 102 to communicate with the various external data source(s) 50 as described herein. In an example, the transceiver 106 supports bidirectional pilot-to-ATC (air traffic control) communications via a datalink. In addition to supporting the data link system, the transceiver 106 is configured to include or support an automatic dependent surveillance broadcast system (ADS-B), a communication management function (CMF) uplink, a terminal wireless local area network (LAN) unit (TWLU), or any other suitable radio communication system that supports communications between the aircraft 100 and the various external source(s) 50. In this regard, the transceiver 106 may allow the aircraft 100 to receive information that would otherwise be unavailable to the pilot and/or co-pilot using only the onboard systems.

In various embodiments, the control module 104 is additionally operationally coupled to one or more databases 120. The databases 120 may include an airport features database, having therein maps and geometries, as well as airport status data for the runways and/or taxi paths at the airport; the airport status data indicating operational status and directional information for the taxi paths (or portions thereof). Additionally, the databases 120 may include a terrain database, having therein topographical information for the airport and surrounding environment.

As mentioned, the control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 is depicted as a computer system including a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Specifically, the memory 152 stores instructions and applications 160. Information in the memory 152 may be organized and/or imported from an external data source 50 during an initialization step of a process; it may also be programmed via a user input device 114. During operation, the processor 150 loads and executes one or more programs, algorithms and rules embodied as instructions and applications 160 contained within the memory 152 and, as such, controls the general operation of the control module 104 as well as the system 102.

The novel program 162 includes rules and instructions which, when executed, cause the control module 104 to perform the functions, techniques, and processing tasks associated with the operation of the system 102. Novel program 162 and associated stored variables 164 may be stored in a functional form on computer readable media, as depicted, in memory 152. While the depicted exemplary embodiment is described in the context of a fully functioning computer system, those skilled in the art will recognize that the mechanisms of the present disclosure are capable of being distributed as a program product 166, with one or more types of non-transitory computer-readable signal bearing media used to store the program and the instructions thereof and carry out the distribution thereof, such as a non-transitory computer readable medium bearing the program 162 and containing computer instructions stored therein for causing a computer processor (such as the processor 150) to perform and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

In executing the process described herein, the processor 150 specifically loads the instructions embodied in the program 162, thereby being programmed with program 162. During execution of program 162, the processor 150 and the memory 152 form a novel dynamic readouts processing engine that performs the processing activities of the system 102.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the transceiver 106. The I/O interface 154 may include one or more network interfaces and can be implemented using any suitable method and apparatus. In various embodiments, the I/O interface 154 is configured to support communication from an external system driver and/or another computer system. Also, in various embodiments, the I/O interface 154 may support communication with technicians, and/or one or more storage interfaces for direct connection to storage apparatuses, such as the database 156. In one embodiment, the I/O interface 154 is integrated with the transceiver 106, and obtains data from external data source(s) directly.

The database 156 may include an aircraft-specific parameters database (comprising aircraft-specific parameters and configuration data for aircraft 100, as well as for a variety of other aircrafts) and parameters and instructions for processing user inputs and rendering images 28 on the display device 26, as described herein. In some embodiments, the database 156 is part of the memory 152. In various embodiments, the database 156 and the database 120 are integrated, either within the control module 104 or external to it. Accordingly, in some embodiments, the airport features and terrain features are pre-loaded and internal to the control module 104. Another form of storage media that may be included in, and utilized by, the control module 104 is an optional hard disk 158.

Figure 2:
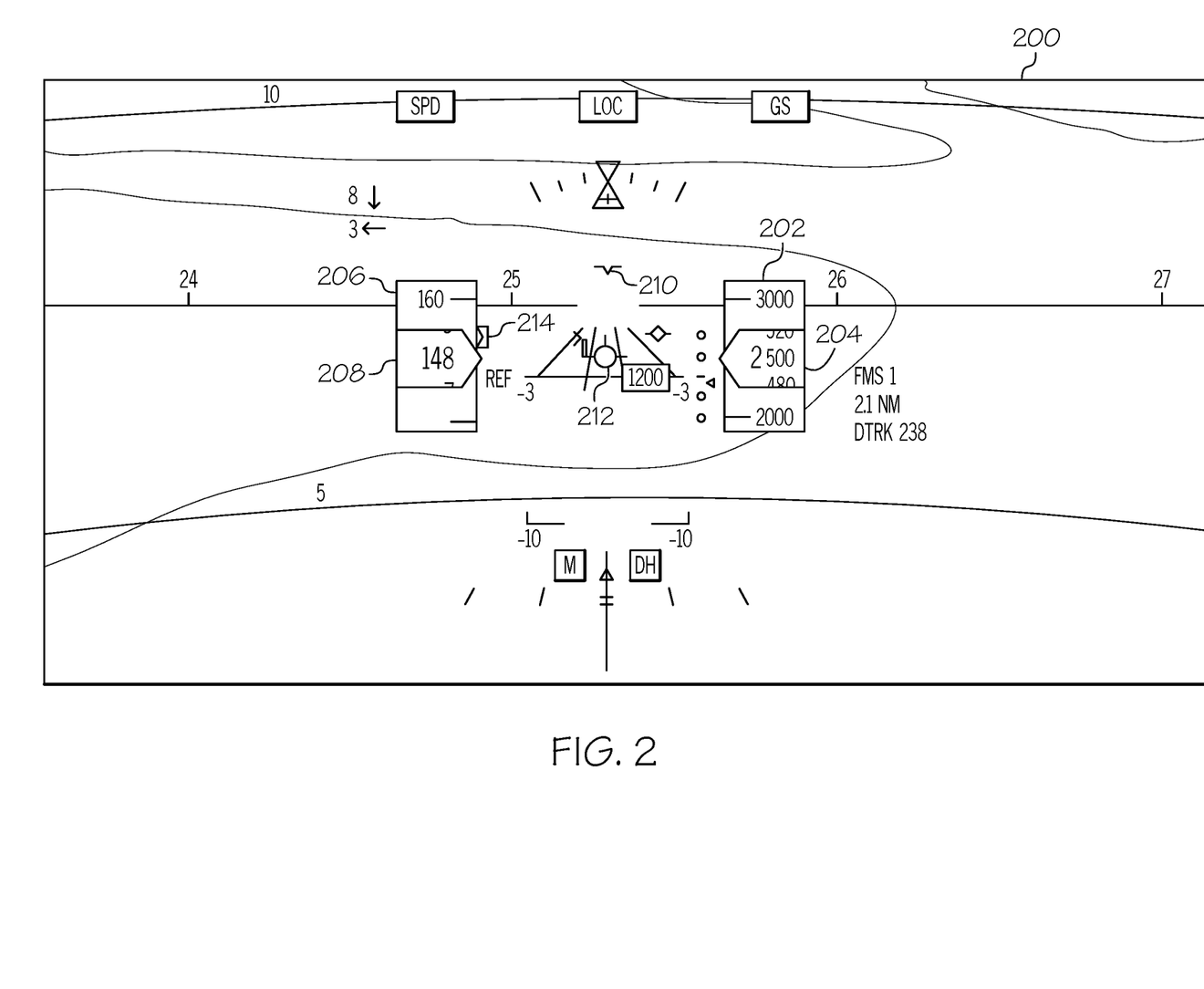
FIG. 2 is an illustration showing an image with analog readouts generated by system for providing dynamic readouts for primary flight displays, in accordance with an exemplary embodiment.
Figure 3:
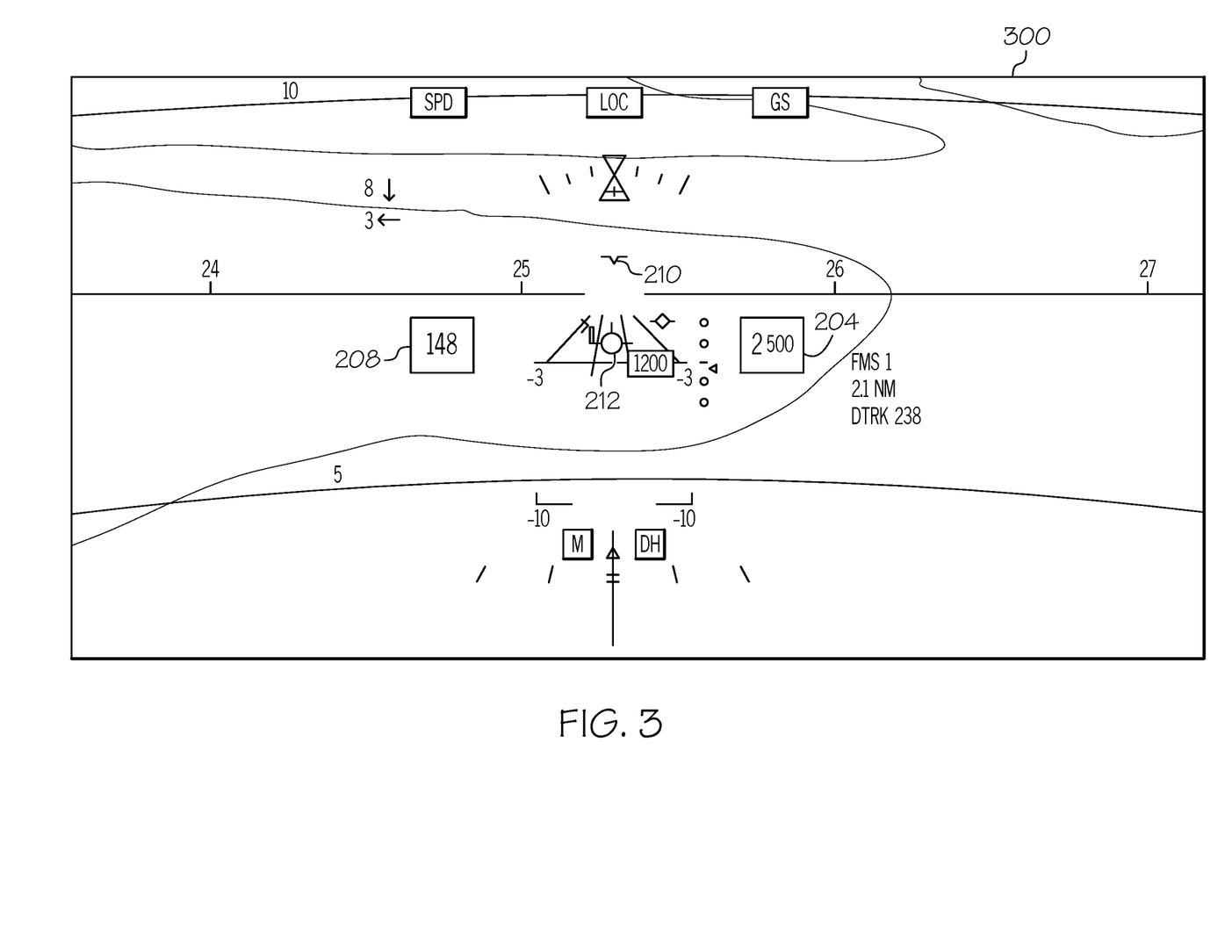
FIG. 3 is the illustration of FIG. 2, showing analog indicators removed, in accordance with an exemplary embodiment.

As mentioned, the technologically improved systems and methods provided herein remove analog aspects of the speed and altitude readouts on images 28 during steady flight conditions. The images 28 of FIGS. 2-5 provide non-limiting examples of this technological enhancement over other flight display systems. The images of FIGS. 2-5 are understood to be based on current aircraft status data for the aircraft 100 and to be dynamically modified responsive to continuously obtaining and processing the current aircraft status data. The images 28 may also be continuously updated to reflect real-time changes with respect to terrain, airport features, weather and neighbor traffic/relevant traffic. The readouts described herein include analog components and digital components. In the image 200 and image 300 an analog indicator of airspeed 206 and an analog indicator of altitude 202 are overlaid on the real-time flight display image. In FIGS. 2-3, the analog indicator of airspeed 206 and the analog indicator of altitude 202 are each configured like a vertical ruler, or tape, providing incremental measurements from near the bottom of the image to near to the top of the image. A reference bug 214 is part of the analog indicator of airspeed 206, in that it is overlaid and removed in conjunction with the analog indicator of airspeed 206.

The analog indicators (206 and 202) are shown with accompanying digital indictors. A digital airspeed indicator 208 with an alphanumeric indication of a current airspeed is rendered as an overlay on the analog indicator of airspeed 206. A digital altitude indicator 204 with an alphanumeric indication of a current altitude is rendered as an overlay on the analog indicator of altitude 202. In the image 200 (and the image 300), a water line 210, indicating a pitch of the aircraft, is centered horizontally between the speed tape (analog indicator of airspeed 206) and the altitude tape (analog indicator of altitude 202). A flight path indicator 212 shows a heading of the aircraft 100.

In operation, the computer system 104 monitors the real-time aircraft status data as it relates to various aspects of a prescribed flight plan, identifies deviations from the flight plan, and measures elapsed time associated with each identified deviation. In a first example, the computer system 104 monitors deviations in airspeed, and when airspeed does not deviate by more than a configurable delta airspeed over its intended airspeed for a duration of time equal to a first time-threshold, the airspeed is determined to be constant and to satisfy a first steady flight condition. In a second example, the computer system 104 monitors deviations in a rate of change of the airspeed. When a rate of change of the airspeed does deviate by more than a delta rate-change over an intended rate of change for a duration of time equal to a second time-threshold, the rate of change of the airspeed is determined to be constant and to satisfy a second steady flight condition. In some embodiments, the first time-threshold and the second time-threshold are the same. In some embodiments, the delta airspeed is plus or minus 5% of the intended airspeed, and the delta rate-change is plus or minus the intended rate of change of airspeed. In some embodiments, the steady flight conditions further comprise determining that the aircraft 100 current approach path corresponds to an intended approach configuration, including having a steady descent, defined as an intended vertical speed, trajectory and altitude.

In an embodiment, responsive to determining that the first steady flight condition is satisfied, the computer system 104 removes the analog indicator of airspeed 206 and the analog indicator of altitude 202. In another embodiment, responsive to determining that the second steady flight condition is satisfied, the computer system 104 removes the analog indicator of airspeed 206 and the analog indicator of altitude 202. In another embodiment, responsive to determining a co-occurrence of both (i) the first steady flight condition is satisfied, and (ii) the second steady flight condition is satisfied, the computer system 104 removes the analog indicator of airspeed 206 and the analog indicator of altitude 202. In image 300, the analog components of the readouts are removed.

Even after the analog components of the readouts are removed, the computer system 104 continually evaluates the first steady flight condition and the second steady flight condition. In an embodiment, upon determining that the first steady flight condition is not occurring, the computer system 104 returns to overlaying the analog indicator of airspeed 206 and the analog indicator of altitude 202. In another embodiment, after the analog indicator of airspeed 206 and the analog indicator of altitude 202 are removed, upon determining that the second steady flight condition is not occurring, the computer system 104 returns to overlaying the analog indicator of airspeed 206 and the analog indicator of altitude 202. In yet another embodiment, after the analog indicator of airspeed 206 and the analog indicator of altitude 202 are removed, upon determining that there is a co-occurrence of both (i) the first steady flight condition is not occurring and (ii) the second steady flight condition is not occurring, the computer system 104 returns to overlaying the analog indicator of airspeed 206 and the analog indicator of altitude 202.

The analog indicators (tapes in FIG. 2), are removed from the image 200 (resulting in image 300) and returned to the image 300 (resulting in image 200) responsive to the determination of steady flight conditions, as described. Comparing image 200 to image 300 shows a technical solution directed to the problem of clutter, wherein it is readily noticeable that the displayed image 300 includes the relevant data (in the form of the digital airspeed indicator 208, and the digital altitude indicator 204), but the image 300 is uncluttered by the analog indicators 202, 214, and 206.

Figure 4:
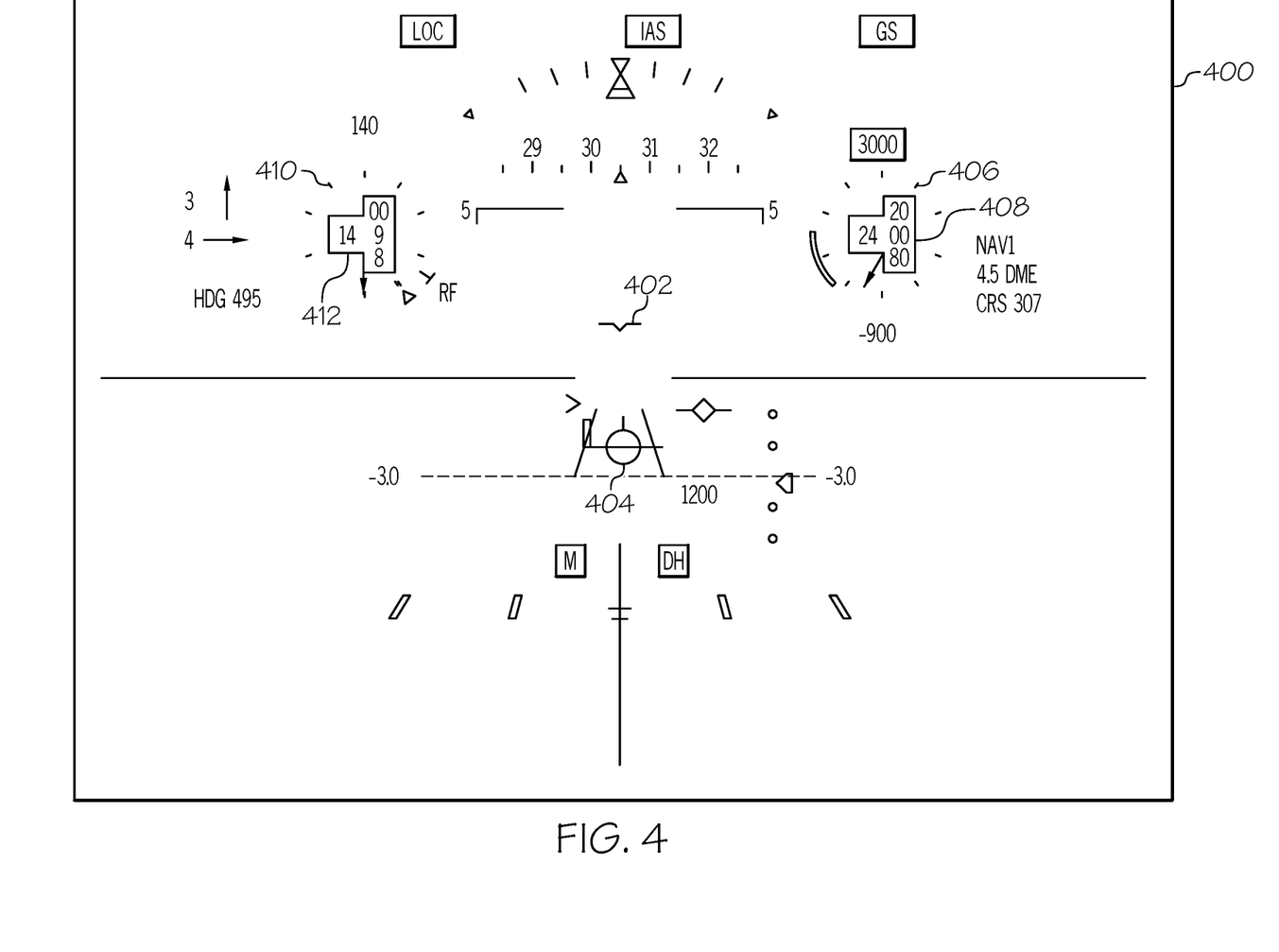
FIG. 4 is an illustration showing an image with analog dials generated by system for providing dynamic readouts for primary flight displays, in accordance with an exemplary embodiment.
Figure 5:
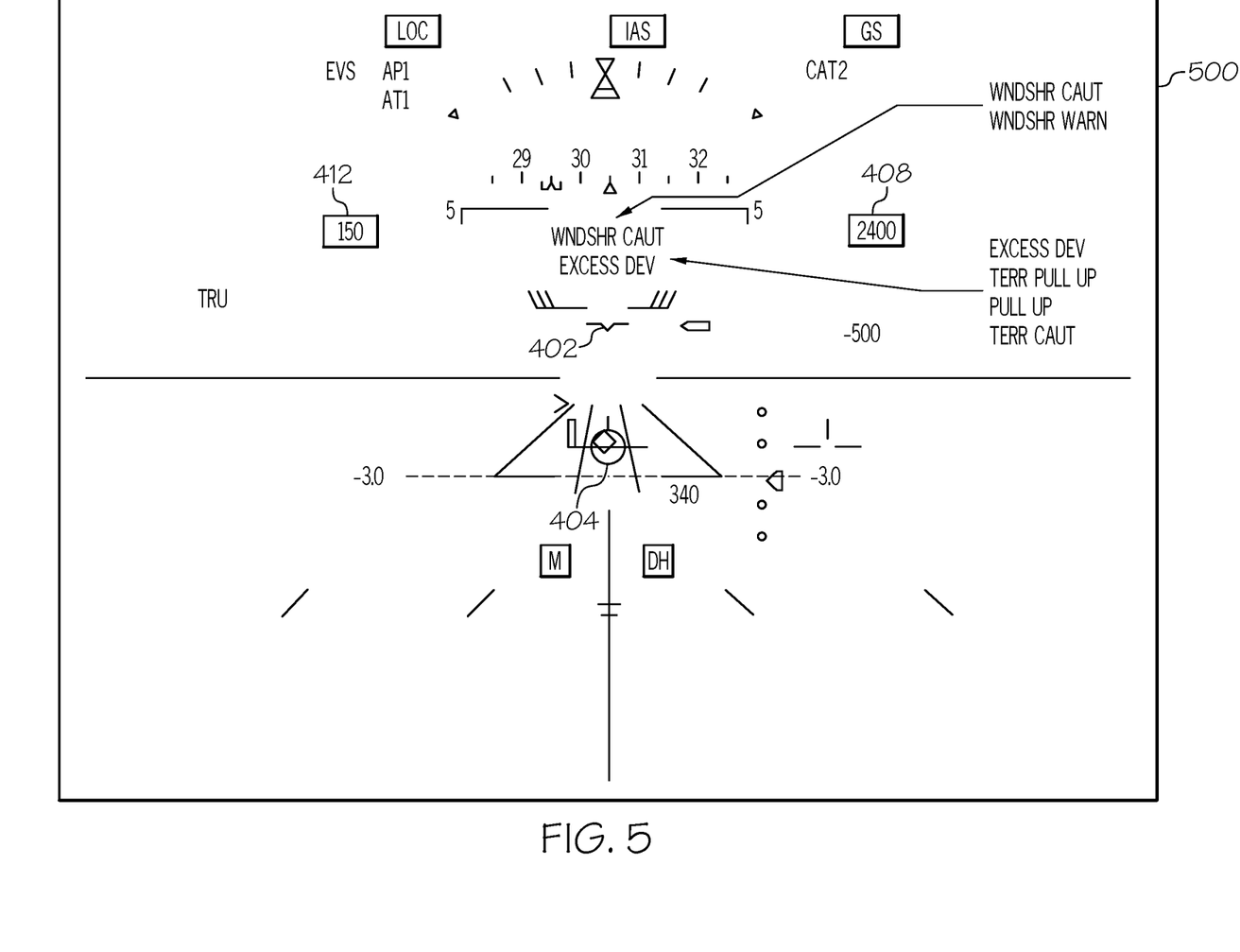
FIG. 5 is an illustration of FIG. 3, showing analog indicators removed, in accordance with an exemplary embodiment.

FIGS. 4-5 provide an example in which the readouts include analog displays are configured as dials rather than as tapes. In image 400, the water mark 402 is centered horizontally between an analog airspeed dial 410 that is the analog indicator of airspeed and an analog indicator of altitude that is the analog altitude dial 406. A flight path vector 404 indicates heading of the aircraft. A digital airspeed indicator 412 with an alphanumeric indication of a current airspeed is rendered as an overlay on the analog indicator of airspeed (analog airspeed dial 410). A digital altitude indicator 408 with an alphanumeric indication of a current altitude is rendered as an overlay on the analog indicator of altitude (analog altitude dial 406).

The first steady flight condition and the second steady flight condition are determined as described above. The analog indicators (dials 410 and 406), are removed from the image 400 (shown removed in image 500) and returned to the image 500 also as described above.

In various embodiments, the dynamic readouts further include performing the return of overlaying the analog indicators step using a visual fade-in technique. As mentioned above, a visual fade technique means that the object moves between a state of being fully rendered and a state of not being rendered in incremental steps, such that the eye perceives a gradual change to that area of the image 28, rather than an abrupt change. In other embodiments, the intensity of a color of the analog indicators may also vary responsive to the steady flight trigger.

Figure 6:
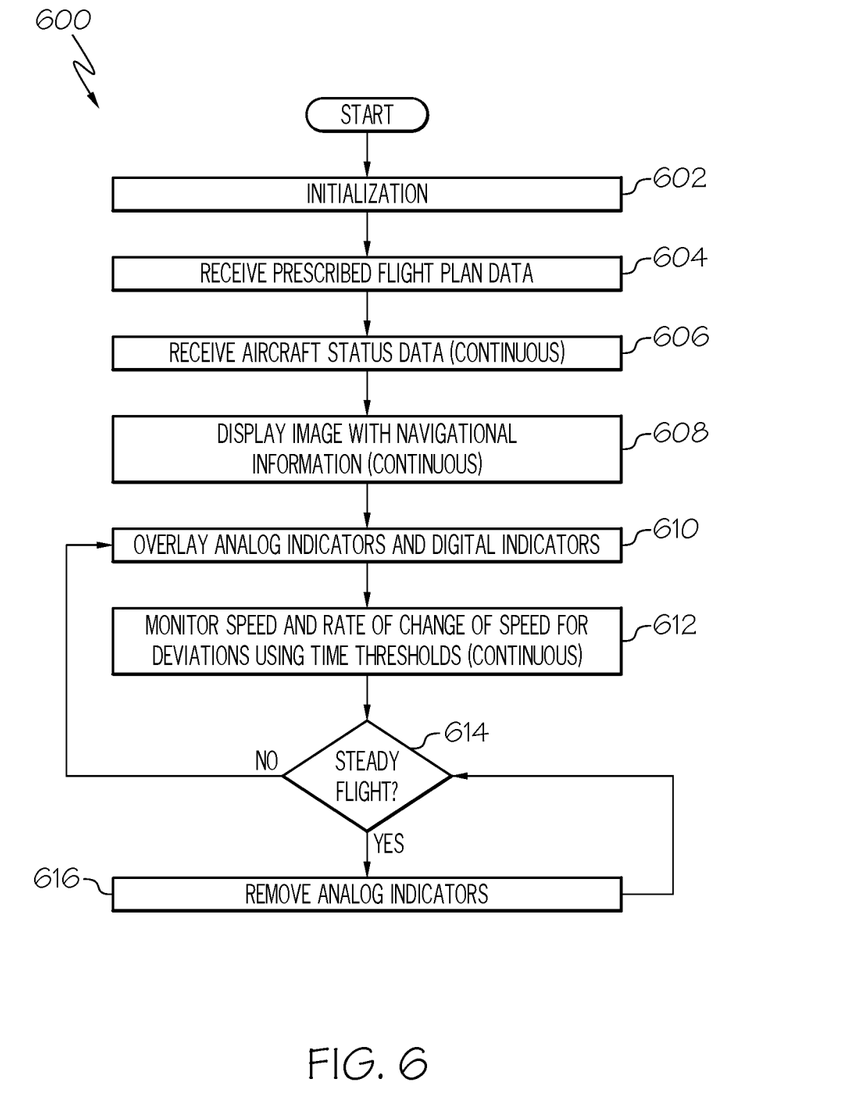
FIG. 6 is a flow chart for a method for providing dynamic readouts for primary flight displays, in accordance with an exemplary embodiment.

Referring now to FIG. 6 and with continued reference to FIGS. 1-5, a flow chart is provided for a method 600 for providing a system 102, in accordance with various exemplary embodiments. Method 600 represents various embodiments of a method for dynamic tapes. For illustrative purposes, the following description of method 600 may refer to elements mentioned above in connection with FIG. 1. In practice, portions of method 600 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 if the intended overall functionality remains intact.

The method starts, and at 602 the control module 104 is initialized. As mentioned above, initialization may comprise uploading or updating instructions and applications 160, program 162, stored variables 164, and various lookup tables stored in the database 156. Stored variables may include, for example, a configurable delta airspeed, a configurable delta rate-change, predetermined amounts of time to use as time-thresholds, parameters for setting up a user interface, and the various shapes, various colors and/or visually distinguishing techniques used for icons and alerts. In some embodiments, program 162 includes additional instructions and rules for rendering information differently based on type of display device in display system 112. Initialization at 602 may also include identifying external sources 50 and/or external signals and the communication protocols to use with each of them.

At 604, the prescribed flight plan data is received. At 606, aircraft status data is received. During operation, it is understood that aircraft status data is continuously received. At 608, an image 28 is generated and displayed that depicts navigational information for the aircraft. In an example, the displayed navigational information may include environmental surroundings of the aircraft and aircraft status data, as described above. The displayed image 28 is continuously updated. In various embodiments, the displayed image 28 represents an integration of data from the navigation system 108, the NavDB 110, airport features (120), terrain (120), weather (52), and traffic (54).

At 610 the following symbolic indictors are overlaid on the image 28: (i) an analog indicator of the airspeed, (ii) an analog indicator of altitude, (iii) a digital airspeed indicator, and (iv) a digital altitude indicator. In subsequent loops through the method, at 610, if the above four symbolic indicators are already displayed, they continue to be displayed; If the analog indicator of the airspeed 206 and the analog indicator of altitude 202 were previously removed from the image 28, at 610, they are returned, i.e., overlaid again, at 610. As mentioned, when a previously removed analog indicator is returned to the image 28, it may be returned using a fade-in technique.

At 612, the computer system 104 monitors deviations in aircraft status data over intended values for the respective aircraft status data. In a first example, at 612, the computer system 104 monitors an airspeed, and triggers an airspeed deviation when current airspeed deviates from an intended airspeed by a configurable delta airspeed. Once a deviation in airspeed is triggered, its duration is measured against a first time-threshold. In a second example, at 612, the computer system 104 monitors a rate of change in the airspeed, and triggers a rate of change deviation when a current a rate of change deviates from an intended a rate of change by a configurable delta rate-change. Once a deviation in a rate of change is triggered, its duration is measured against a second time-threshold.

As mentioned, the method 600 uses steady flight conditions as a trigger to dynamically modify the readout on the displayed image. At 614, the method 600 tests for steady flight conditions. When there are no triggered airspeed deviations, or there are triggered airspeed deviations, but they are shorter in time than the first time-threshold, the airspeed is determined to be constant, and to satisfy a first steady flight condition at 614. When there are no triggered rate of change deviations, or there are triggered rate of change deviations but they are shorter in time than the second time-threshold, the rate of change is determined to be constant and to satisfy a second steady flight condition at 614. In some embodiments, the first time-threshold and the second time-threshold are the same.

Determination that steady flight conditions are met at 614 is selectable. In a first embodiment, steady flight conditions comprise only the first steady flight conditions. In a second embodiment, steady flight conditions comprise only the second steady flight conditions. In a third embodiment, steady flight conditions comprise the co-occurrence of the first steady flight conditions and the second steady flight conditions. If steady flight conditions are not met at 614, the method 600 returns to overlaying all four symbolic indicators at 610.

If steady flight conditions are met at 614, the readout is dynamically modified, in that the analog indicator of airspeed 206 and the analog indicator of altitude 202 are removed from the image 28. In some embodiments, when an analog indicator is removed from the image 28, it may be removed using a fade-out technique. In a subsequent pass through 616, if the analog indicator of airspeed 206 and the analog indicator of altitude 202 were already removed from the image 28, they continue to be omitted. After 616, the method 600 returns to checking for steady flight conditions at 614.

Thus, technologically improved systems and methods for providing dynamic readouts for a flight display are provided. In this novel solution to the presentation of relevant and critical information to a pilot, the primary flight display is uncluttered by analog components while steady flight conditions are underway, and an extreme change in speed or acceleration (defined by one that exceeds the configurable delta speed or delta rate-change) will trigger the analog component to come back into view. As is readily appreciated, the above examples of the system 102 for providing dynamic readouts for a flight display are non-limiting, and many others may be addressed by the control module 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from the set including A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight display system for an aircraft, comprising:
   a source of real-time aircraft status data;
   a source of flight plan data;
   a display system configured to process the aircraft status data to display a continuously updated image depicting the aircraft status; and
   a computer system configured to receive and process the aircraft status data and the flight plan data to:
   (a) command the display system to overlay on the image, (i) an analog indicator of the airspeed, (ii) an analog indicator of altitude, (iii) a digital airspeed indicator, and (iv) a digital altitude indicator;
   (b) determine whether a steady flight condition is occurring; and
   upon determining that a steady flight condition is occurring:
     command the display system to remove (i) and (ii) from the image;
     repeat (b); and
   upon determining that a steady flight condition is not occurring,
     command the display system to return the overlay of (i) and (ii); and
     render graphic elements and a rate of change of speed indicator.

2. The flight display system of claim 1, wherein the computer system is further configured to determine that a steady flight condition is occurring by:
   monitoring an airspeed of the aircraft; and
   determining that the airspeed of the aircraft is constant when the airspeed does not deviate by more than a configurable delta airspeed over a respective intended airspeed for a duration of time equal to a first time-threshold.

3. The flight display system of claim 2, wherein the computer system is further configured to:
   monitor an aircraft current approach path; and
   determine that a steady flight condition is occurring when the aircraft current approach path corresponds to an intended approach configuration, including having a steady descent, defined as an intended vertical speed, trajectory and altitude.

4. The flight display system of claim 2, wherein the speed of the aircraft being constant is a first steady flight condition, and the computer system is further configured to determine that a second steady flight condition is occurring when a rate of change of the speed of the aircraft is constant.

5. The flight display system of claim 3, wherein the computer system is further configured to:
monitor a rate of change of the speed of the aircraft; and
determine that the rate of change of the speed of the aircraft is constant when the rate of change of the speed of the aircraft does not deviate by more than a configurable delta rate-change over a respective intended rate of change for a duration of time equal to a second time-threshold.

6. The flight display system of claim 4, wherein the computer system is configured to command the display system to return the overlay of (i) and (ii) using a visual fade-in technique.

7. The flight display system of claim 5, wherein the analog indicator of the airspeed is a speed tape, and the analog indicator of altitude is an altitude tape.

8. The flight display system of claim 5, wherein the analog indicator of the airspeed is a dial and the analog indicator of altitude is an altitude dial.

9. A processor executable method for a flight display system in an aircraft, comprising
receiving real-time aircraft status data including an airspeed;
displaying a continually updated image of navigational information for the aircraft;
overlaying the image with, (i) an analog indicator of the airspeed, (ii) an analog indicator of altitude, (iii) a digital airspeed indicator, and (iv) a digital altitude indicator;
determining whether a steady flight condition is occurring from among a first steady flight condition being a constant airspeed and a second steady flight condition being a constant a rate of change of the airspeed; and
upon determining that a steady flight condition is occurring:
removing (i) and (ii) from the image;
repeating determining whether a steady flight condition is occurring; and
upon determining that a steady flight condition is are not occurring,
commanding the display system to return the overlay of (i) and (ii).

10. The method of claim 9, further comprising returning the overlay of (i) and (ii) using a visual fade-in technique.

11. The method of claim 10, further comprising:
monitoring an airspeed of the aircraft; and
determining the airspeed of the aircraft is constant when the airspeed does not deviate by more than a configurable delta airspeed over a respective intended airspeed for a duration of time equal to a first time-threshold.

12. The method of claim 11, wherein the analog indicator of the airspeed is a speed tape, and the analog indicator of altitude is an altitude tape.

13. The method of claim 11, wherein the analog indicator of the airspeed is a dial and the analog indicator of altitude is an altitude dial.

14. The method of claim 9, further comprising:
monitoring the rate of change of the airspeed of the aircraft; and
determining that the rate of change of the airspeed of the aircraft is constant when the rate of change of the airspeed of the aircraft does not deviate by more than a configurable delta rate-change over a respective intended rate of change for a duration of time equal to a second time-threshold.

15. An aircraft, comprising:
a source of flight plan data;
a source of aircraft status data including an airspeed;
a display system configured to process the flight plan data and the aircraft status data to render an image of navigational information for the aircraft; and
a computer system configured to receive and process the aircraft status data and the flight plan data to:
(a) command the display system to overlay on the image, (i) an analog indicator of the airspeed, (ii) an analog indicator of altitude, (iii) a digital airspeed indicator, and (iv) a digital altitude indicator;
(b) determine whether a steady flight condition is occurring from among a first steady flight condition being the airspeed is constant and a second steady flight condition being a rate of change of the airspeed is constant; and
upon determining that a steady flight condition is occurring:
command the display system to remove (i) and (ii) from the image;
repeat (b); and
command the display system to return the overlay of (i) and (ii)
responsive to determining that a steady flight condition is not occurring.

16. The aircraft of claim 15, wherein the computer system is further configured to:
monitor a rate of change of the airspeed of the aircraft; and
determine that the rate of change of the airspeed of the aircraft is constant when the rate of change of the airspeed of the aircraft does not deviate by more than a configurable delta rate-change over a respective intended rate of change.

17. The aircraft of claim 15, wherein the computer system is further configured to:
monitor the airspeed of the aircraft; and
determine that the airspeed of the aircraft is constant when the airspeed does not deviate by more than a configurable delta airspeed over a respective intended airspeed.

18. The aircraft of claim 17, wherein the analog indicator of the airspeed is a speed tape, and the analog indicator of altitude is an altitude tape.

* * * * *

UNITED STATES PATENT AND TRADEMARK OFFICE
CERTIFICATE OF CORRECTION

Page 1 of 1

PATENT NO. : 10,883,851 B2
APPLICATION NO. : 16/132934
DATED : January 5, 2021
INVENTOR(S) : Thea L. Feyereisen and Gang He It is certified that error appears in the above-identified patent and that said Letters Patent is hereby corrected as shown below:

In the Claims

Column 15, Line 40, "are" should be removed.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*